US009819518B2

(12) United States Patent
Ikenaga

(10) Patent No.: US 9,819,518 B2
(45) Date of Patent: Nov. 14, 2017

(54) SEMICONDUCTOR DEVICE, SEMICONDUCTOR SYSTEM INCLUDING THE SAME, AND CONTROL METHOD OF SEMICONDUCTOR DEVICE

(71) Applicant: Renesas Electronics Corporation, Tokyo (JP)

(72) Inventor: Yoshifumi Ikenaga, Tokyo (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

(21) Appl. No.: 14/925,366

(22) Filed: Oct. 28, 2015

(65) Prior Publication Data

US 2016/0191044 A1    Jun. 30, 2016

(30) Foreign Application Priority Data

Dec. 26, 2014    (JP) .................................. 2014-266206

(51) Int. Cl.
   *H03K 3/00*    (2006.01)
   *H04L 25/02*   (2006.01)
(52) U.S. Cl.
   CPC ................................ *H04L 25/0272* (2013.01)
(58) Field of Classification Search
   None
   See application file for complete search history.

(56) References Cited

U.S. PATENT DOCUMENTS

| 2013/0314961 | A1* | 11/2013 | Eom ................... H02M 1/4208 363/89 |
| 2014/0328427 | A1* | 11/2014 | Chang ..................... H04L 27/10 375/271 |
| 2014/0347103 | A1* | 11/2014 | Snook ................ H03K 17/0828 327/109 |
| 2015/0103949 | A1* | 4/2015 | Kihara .................... H01L 28/10 375/296 |
| 2016/0191044 | A1* | 6/2016 | Ikenaga .................. H04L 25/02 327/109 |
| 2016/0277222 | A1* | 9/2016 | Fox ..................... H04L 25/4906 |

FOREIGN PATENT DOCUMENTS

JP    2010-154615 A    7/2010

* cited by examiner

*Primary Examiner* — Lincoln Donovan
*Assistant Examiner* — Khareem E Almo
(74) *Attorney, Agent, or Firm* — Sughrue Mion, PLLC

(57) ABSTRACT

According to an embodiment, a module M1 includes an internal circuit 14, and a standard information transmitting unit 15 that transmits a result of a comparison between a voltage supplied from an externally-disposed control device 1 and a threshold voltage specified based on a communication standard of the internal circuit 14 to the control device 1 as information on the communication standard of the internal circuit 14. As a result, the module M1 can communicate with the control device 1 according to a correct communication standard.

13 Claims, 12 Drawing Sheets

SEMICONDUCTOR DEVICE, SEMICONDUCTOR SYSTEM INCLUDING THE SAME, AND CONTROL METHOD OF SEMICONDUCTOR DEVICE

CROSS-REFERENCE TO RELATED APPLICATIONS

This application is based upon and claims the benefit of priority from Japanese patent application No. 2014-266206, filed on Dec. 26, 2014, the disclosure of which is incorporated herein in its entirety by reference.

BACKGROUND

The present invention relates to a semiconductor device, a semiconductor system including the same, and a control method of a semiconductor device. For example, the present invention relates to a semiconductor device, a semiconductor system including the same, and a control method of a semiconductor device suitable for performing communication according to a correct communication standard.

For data communication between a controller and a module, an I2C (Inter-Integrated Circuit) mode has been widely used as the communication mode. In the I2C communication, since the controller can be connected with a plurality of modules through a common bus, the number of signal lines can be reduced.

Examples of the modules include a sensor, a liquid crystal display, and so on. It should be noted that some of the modules have a drive voltage (operating voltage) different from that of the other modules. Therefore, the controller needs to supply a drive voltage that is specified by a communication standard and supported by a module with which the controller communicates, and perform communication at the drive voltage (signal amplitude) supported by the module.

To satisfy this requirement, there is a method in which the drive voltage of a module is checked in advance, for example, and the drive voltage supplied from the controller to the module is manually set.

However, the present inventors have found the following problem. There is a possibility of an erroneous setting in the above-described method in which the drive voltage is manually set. When an erroneous setting occurs, normal data communication cannot be performed any longer. Further, if a drive voltage higher than the rated voltage is applied to a module, the module could be broken.

Japanese Unexamined Patent Application Publication No. 2010-154615 discloses a countermeasure for this problem. In a power supply voltage supply system disclosed in Japanese Unexamined Patent Application Publication No. 2010-154615, a device (module) includes a pattern circuit that changes connections among a plurality of resistive elements according to power supply information held in a power receiving unit of the device, and a power supply voltage supply unit (control device) controls a power supply voltage supplied to the device based on a combined resistance of the plurality of resistive elements read from the device through a control signal line. As a result, a correct power supply voltage is supplied to the device.

SUMMARY

As described above, there is a possibility of an erroneous setting in the method in which the drive voltage is manually set. When an erroneous setting occurs, normal data communication cannot be performed any longer. Further, if a drive voltage higher than the rated voltage is applied to a module, the module could be broken. Japanese Unexamined Patent Application Publication No. 2010-154615 discloses an example of a configuration in which a power supply voltage suitable for a device (module) is supplied from a power supply voltage supply unit (control device) to the device. However, there is still a desire to develop a technique for correctly setting a communication standard between the control device and the module.

Other problems to be solved and novel features will be more apparent from the following descriptions in this specification and the accompanying drawings.

A first aspect of the present invention is a semiconductor device including: an internal circuit; and a standard information transmitting unit that transmits a result of a comparison between a voltage supplied from an externally-disposed control device and a threshold voltage specified based on a communication standard of the internal circuit to the control device as information on the communication standard of the internal circuit.

Further, another aspect of the present invention is a control method of a semiconductor device including: receiving a voltage from an externally-disposed control device; and transmitting a result of a comparison between the received voltage and a threshold voltage specified based on a communication standard of an internal circuit to the control device as information on the communication standard of the internal circuit.

According to the above-described embodiment, it is possible to provide a semiconductor device, a semiconductor system including the same, and a control method of a semiconductor device capable of performing communication according to a correct communication standard by transmitting information on the communication standard in response to a request from a control device.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiments are explained hereinafter with reference to the drawings. It should be noted that the drawings are made in a simplified manner, and therefore the technical scope of the embodiments should not be narrowly interpreted based on those drawings. Further, the same components are assigned the same symbols and their duplicated explanations are omitted.

In the following embodiments, when necessary, the present invention is explained by using separate sections or separate embodiments. However, those embodiments are not unrelated with each other, unless otherwise specified. That is, they are related in such a manner that one embodiment is a modified example, an application example, a detailed example, or a supplementary example of a part or the whole of another embodiment. Further, in the following embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following embodiments, their components (including operation steps and the like) are not necessarily indispensable except for cases where the component is explicitly specified or the component is obviously indispensable based on its principle. Similarly, in the following embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

First Embodiment

Figure 1:
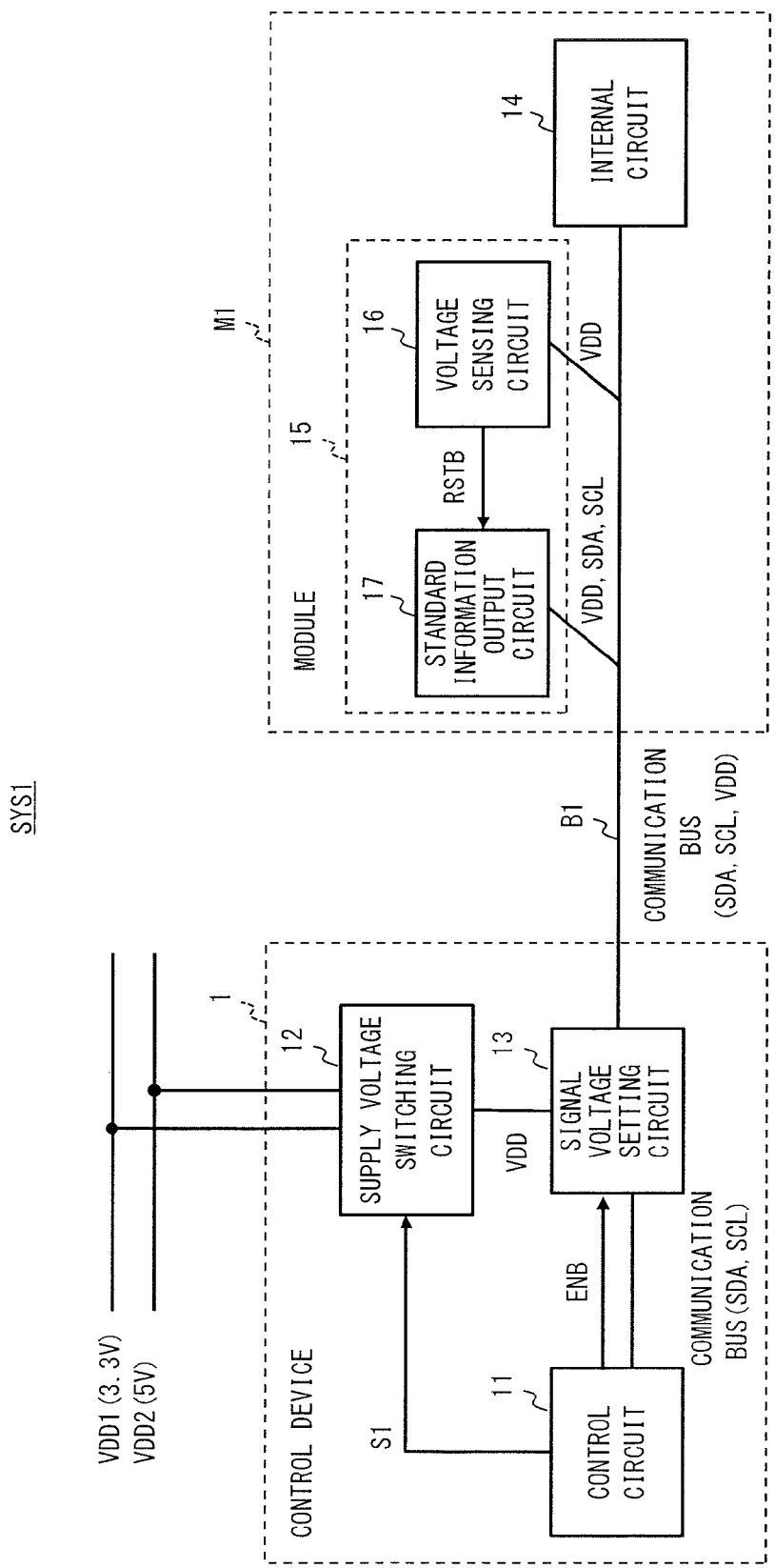
FIG. 1 shows a configuration example of a semiconductor system according to a first embodiment.

FIG. 1 is a block diagram showing a configuration of a semiconductor system SYS1 according to a first embodiment. In the semiconductor system SYS1 according to this embodiment, when a control device acquires communication standard information of a module, the module transmits a result of a comparison between a voltage supplied from the control device through a communication bus and a threshold voltage specified based on a communication standard of the module to the control device as information on the communication standard of the module. As a result, the control device can correctly set the communication standard between the control device and the module based on the communication standard information acquired from the module. Consequently, correct data communication can be performed between the control device and the module. Detailed explanations of the above are given hereinafter.

As shown in FIG. 1, the semiconductor system SYS1 includes a control device 1, a module (semiconductor device) M1, and a communication bus B1 for connecting the control device 1 with the module M1. This embodiment is explained by using an example case where the I2C mode is used as the data communication mode between the control device 1 and module M1. Therefore, the communication bus B1 includes, at least, a power supply line VDD, a ground line GND, a clock signal line SCL, and a data signal line SDA.

(Control Device 1)

The control device 1 is formed from one or a plurality of chips and includes a control circuit 11, a supply voltage switching circuit 12, and a signal voltage setting circuit 13. The control circuit 11 is, for example, a microcomputer.

The control circuit 11 is connected to the signal voltage setting circuit 13 through the signal lines SDA and SCL included in the communication bus B1.

(Control Circuit 11)

The control circuit 11 is a circuit that performs data communication with the module M1 through the communication bus B1. Note that the control circuit 11 has a function of communicating with the module M1 at a communication speed supported by the module M1.

Further, the control circuit 11 controls the supply voltage switching circuit 12 and the signal voltage setting circuit 13 by outputting a voltage control signal S1 and an enabling signal ENB to the supply voltage switching circuit 12 and the signal voltage setting circuit 13, respectively.

Note that the control circuit 11 first acquires information on the communication standard of the internal circuit of the module M1 (hereinafter also referred to simply as "communication standard information of the module M1") before starting a normal operation, and then performs data communication with the module M1 according to the acquired communication standard. Note that this embodiment is explained by using an example case where the control circuit 11 first acquires information on a drive voltage as the communication standard information of the module M1, and then performs data communication with the module M1 while supplying the drive voltage to the module M1. The method for acquiring the communication standard information of the module M1 (the drive voltage information in this example) performed by the control circuit 11 is described later.

(Supply Voltage Switching Circuit 12)

The supply voltage switching circuit 12 is a circuit that changes a power supply voltage supplied to the power supply line VDD. For example, the supply voltage switching circuit 12 selects either a 3.3V-power supply voltage supplied from a power supply VDD1 (hereinafter referred to as a "power supply voltage VDD1") or a 5V-power supply voltage supplied from a power supply VDD2 (hereinafter referred to as a "power supply voltage VDD2") based on the voltage control signal S1 received from the control circuit 11, and outputs the selected power supply voltage to the power supply line VDD.

Figure 2:
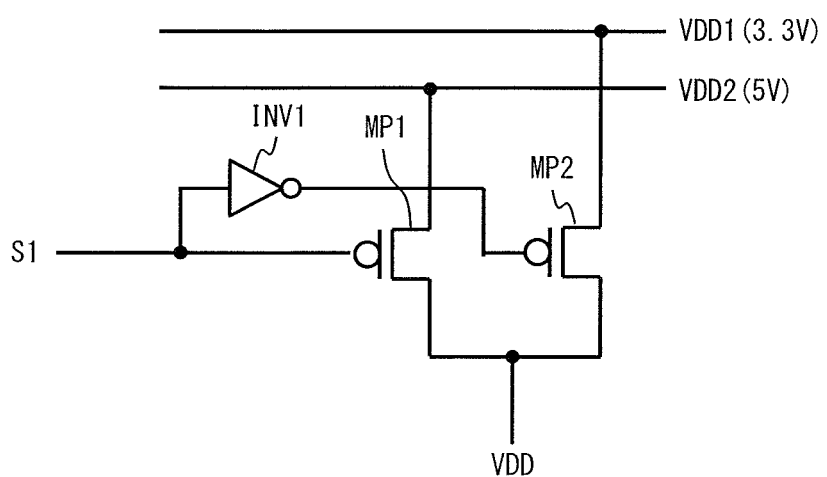
FIG. 2 is a circuit diagram showing a configuration example of a supply voltage switching circuit provided in the semiconductor system shown in FIG. 1.

FIG. 2 is a circuit diagram showing a configuration example of the supply voltage switching circuit 12.

As shown in FIG. 2, the supply voltage switching circuit 12 includes P-channel MOS transistors (hereinafter simply referred to as "transistors") MP1 and MP2, and an inverter INV1.

The transistor MP1 is disposed between the power supply VDD2 and the power supply line VDD, and its On/Off state is controlled according to the voltage control signal S1 supplied from the control circuit 11. The transistor MP2 is disposed between the power supply VDD1 and the power supply line VDD, and is controlled so that its On/Off state is complementary to that of the transistor MP1.

For example, when the voltage control signal S1 supplied from the control circuit 11 is at an H-level (High-level), the transistor MP1 is turned off and the transistor MP2 is turned on. As a result, the 3.3V-power supply voltage VDD1 is supplied to the power supply line VDD. On the other hand, when the voltage control signal S1 supplied from the control circuit 11 is at an L-level (Low-level), the transistor MP1 is turned on and the transistor MP2 is turned off. As a result, the 5V-power supply voltage VDD2 is supplied to the power supply line VDD.

Note that this embodiment is explained by using an example case where the supply voltage switching circuit 12 selectively supplies one of the two power supply voltages VDD1 and VDD2 to the power supply line VDD. However, the present invention is not limited to such an example. The supply voltage switching circuit 12 can be modified as appropriate so that it selectively supplies one of three or more power supply voltages to the power supply line VDD.

(Signal Voltage Setting Circuit 13)

The signal voltage setting circuit 13 is a circuit that sets the voltage levels of the signal lines SDA and SCL to predetermined voltages when the control device 1 acquires the communication standard information of the module M1. For example, the signal voltage setting circuit 13 pulls down (i.e., lowers) both the signals lines SDA and SCL to an L-level when the control device 1 acquires the communication standard information of the module M1.

Figure 3:
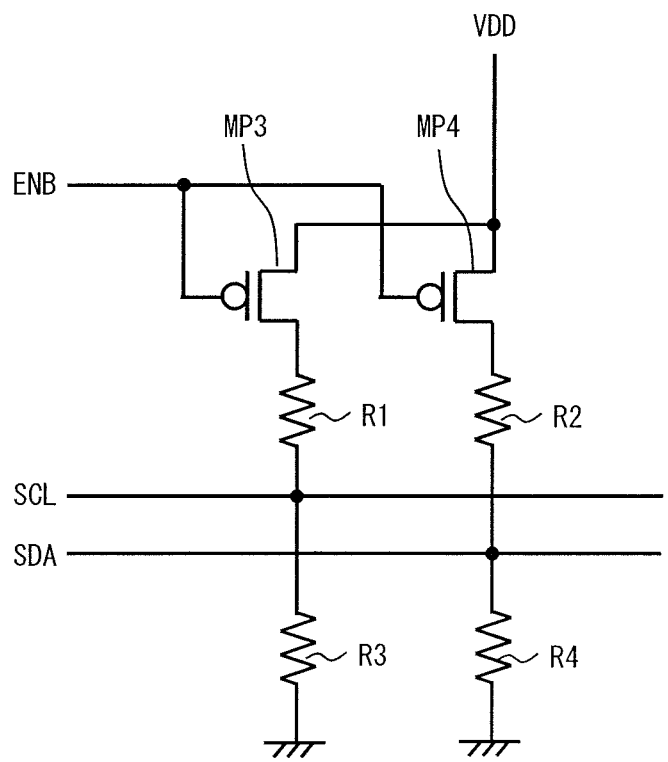
FIG. 3 is a circuit diagram showing a configuration example of a signal voltage setting circuit provided in the semiconductor system shown in FIG. 1.

FIG. 3 is a circuit diagram showing a configuration example of the signal voltage setting circuit 13.

As shown in FIG. 3, the signal voltage setting circuit 13 includes P-channel MOS transistors (hereinafter simply referred to as "transistors") MP3 and MP4, and resistive elements R1 to R4. Note that the resistance values of the pull-down resistive elements R3 and R4 are sufficiently higher than those of the pull-up resistive elements R1 and R2.

The transistor MP3 is disposed between the power supply line VDD and one end of the resistive element R1, and its On/Off state is controlled according to the enabling signal ENB supplied from the control circuit 11. The transistor MP4 is disposed between the power supply line VDD and one end of the resistive element R2, and its On/Off state is controlled according to the enabling signal ENB supplied from the control circuit 11. The other end of the resistive element R1 is connected to the signal line SCL, and the other end of the resistive element R2 is connected to the signal line SDA. The resistive element R3 is disposed between the signal line SCL and the ground line GND. The resistive element R4 is disposed between the signal line SDA and the ground line GND.

For example, in a normal operation state (hereinafter also referred to as a "normal operation mode") in which data communication is performed between the control circuit 11 and the module M1, the control circuit 11 outputs an enabling signal ENB having an L-level. As a result, since both of the transistors MP3 and MP4 are turned on, both of the signal lines SCL and SDA are pulled up (i.e., raised) to an H-level. In contrast to this, when the control circuit 11 acquires the communication standard information of the module M1 (hereinafter also referred to as a "communication standard acquisition mode"), the control circuit 11 outputs an enabling signal ENB having an H-level. As a result, since both of the transistors MP3 and MP4 are turned off, both of the signal lines SCL and SDA are pulled down to an L-level by the resistive elements R3 and R4.

A method for exchanging data between the control circuit 11 and the module M1 in the normal operation state is explained hereinafter.

In the normal operation state, when a signal SDA (a signal on the signal line SDA) having an H-level is transmitted from the control circuit 11 to the module M1, the control circuit 11 maintains the state of the signal SDA, which has been pulled up to the H-level by the signal voltage setting circuit 13. As a result, the signal SDA having the H-level is supplied to the module M1. Further, when a signal SDA having an L-level is transmitted from the control circuit 11 to the module M1, the control circuit 11 discharges the electric charge accumulated in the signal line SDA, which has been pulled up to the H-level by the signal voltage setting circuit 13. As a result, the signal SDA having the L-level is supplied to the module M1. The above explanation is similarly applicable to a signal SCL (a signal on the signal line SCL).

On the other hand, when a signal SDA having an H-level is transmitted from the module M1 to the control circuit 11 in the normal operation state, the module M1 maintains the state of the signal SDA, which has been pulled up to the H-level by the signal voltage setting circuit 13. As a result, the signal SDA having the H-level is supplied to the control circuit 11. Further, when a signal SDA having an L-level is transmitted from the module M1 to the control circuit 11 in the normal operation state, the module M1 discharges the electric charge accumulated in the signal line SDA, which has been pulled up to the H-level by the signal voltage setting circuit 13. As a result, the signal SDA having the L-level is supplied to the control circuit 11. The above explanation is similarly applicable to the signal SCL.

In contrast to this, when the control circuit 11 acquires communication standard information, the control circuit 11 maintains the states of the signal lines SDA and SCL, which have been pulled down to the L-level by the signal voltage setting circuit 13. As a result, the signals SDA and SCL having the L-level are supplied to the module M1. In other words, this state is expressed as "(SDA, SCL)=(0, 0)".

Note that this embodiment is explained by using an example case where when the control device 1 acquires the communication standard information of the module M1, the signals SDA and SCL are pulled down to an L-level. However, the present invention is not limited to such an example. In the case where the communication standard information of the module M1 can be expressed by using one bit, a configuration in which only one of the signal lines SDA and SCL is pulled down to an L-level may be used. For example, in a configuration in which only the signal line SDA is pulled down, the signal voltage setting circuit 13 may include only the transistor MP4 and the resistive elements R2 and R4.

(Module M1)

The module M1 includes an internal circuit 14 and a standard information transmitting unit 15. Note that the standard information transmitting unit 15 may be disposed outside the module M1. That is, the standard information transmitting unit 15 may be retrofitted to the module M1.

(Standard Information Transmitting Unit 15)

When the control device 1 acquires the communication standard information of the module M1, the standard information transmitting unit 15 compares a voltage supplied from the control device 1 through the power supply line VDD with a threshold voltage, and transmits the result of the comparison to the control device 1 through the communication bus B1 as the communication standard information (the drive voltage information in this example) of the module M1.

More specifically, the standard information transmitting unit 15 includes a voltage sensing circuit 16 and a standard information output circuit 17.

(Voltage Sensing Circuit 16)

When the control device 1 acquires the communication standard information of the module M1, the voltage sensing circuit 16 makes a sensing signal RSTB active (i.e., outputs an H-level) when the voltage supplied from the control device 1 through the power supply line VDD is higher than the threshold voltage determined based on the communication standard (the drive voltage in this example) of the module M1. On the other hand, when the voltage supplied from the control device 1 through the power supply line VDD is lower than the threshold voltage determined based on the communication standard (the drive voltage in this example) of the module M1, the voltage sensing circuit 16 makes the sensing signal RSTB inactive (i.e., outputs an L-level).

For example, when the drive voltage of the module M1 is 3.3 V, the threshold voltage of the voltage sensing circuit 16 disposed in the module M1 is set to about 3 V. When the 3.3V-voltage VDD1 is supplied to this voltage sensing circuit 16 from the control device 1 through the power supply line VDD, the voltage sensing circuit 16 makes the sensing signal RSTB active.

Further, for example, when the drive voltage of the module M1 is 5 V, the threshold voltage of the voltage sensing circuit 16 disposed in the module M1 is set to about 4 V. When the 5V-voltage VDD2 is supplied to this voltage sensing circuit 16 from the control device 1 through the power supply line VDD, the voltage sensing circuit 16 makes the sensing signal RSTB active.

Figure 4:
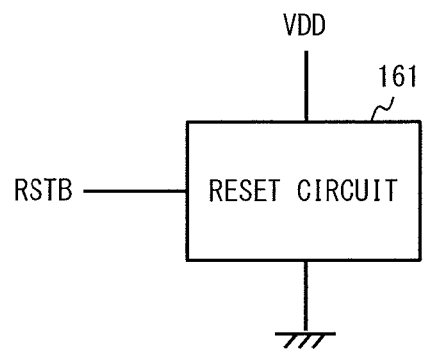
FIG. 4 is a circuit diagram showing a configuration example of a voltage sensing circuit provided in the semiconductor system shown in FIG. 1.

FIG. 4 is a block diagram showing a configuration example of the voltage sensing circuit 16. As shown in FIG. 4, the voltage sensing circuit 16 includes a reset circuit 161. The reset circuit 161 is disposed between the power supply line VDD and the ground line GND. Further, when the voltage of the power supply line VDD becomes higher than the threshold voltage, the reset circuit 161 changes the level of the reset signal, i.e., the sensing signal RSTB from an L-level to an H-level.

(Standard Information Output Circuit 17)

The standard information output circuit 17 outputs the communication standard information of the module 1, which is known based on the sensing result of the voltage sensing circuit 16, to the control device 1 through the signals SDA and SCL included in the communication bus B1. In other words, the standard information output circuit 17 sets the voltage levels of the signal lines SDA and SCL included in the communication bus B1 according to the state of the sensing signal RSTB output from the voltage sensing circuit 16.

Figure 5:
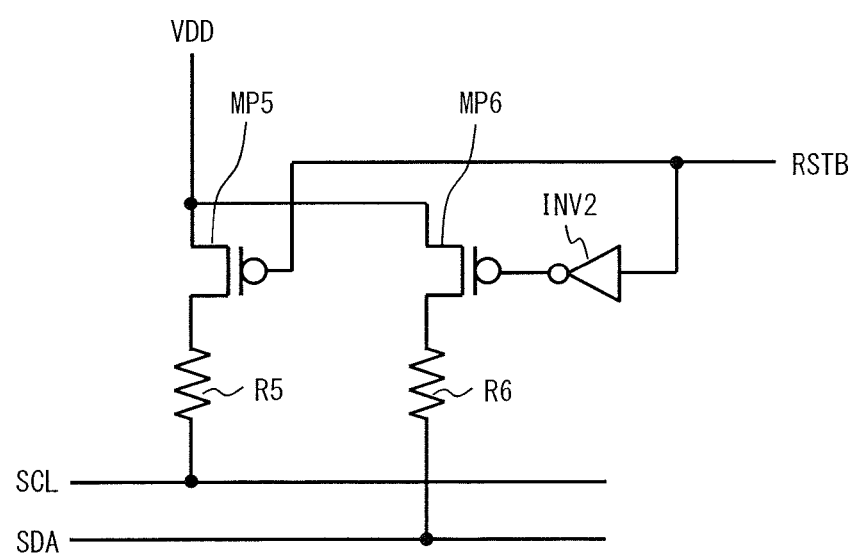
FIG. 5 is a circuit diagram showing a configuration example of a standard information output circuit provided in the semiconductor system shown in FIG. 1.

FIG. 5 is a circuit diagram showing a configuration example of the standard information output circuit 17.

As shown in FIG. 5, the standard information output circuit 17 includes P-channel MOS transistors (hereinafter simply referred to as "transistors") MP5 and MP6, an inverter INV2, and resistive elements R5 and R6. Note that the resistance values of the pull-up resistive elements R5 and R6 are roughly the same as those of the pull-up resistive elements R1 and R2 disposed in the signal voltage setting circuit 13 and sufficiently lower than those of the pull-down resistive elements R3 and R4 disposed in the signal voltage setting circuit 13.

The transistor MP5 is disposed between the power supply line VDD and one end of the resistive element R5, and its On/Off state is controlled according to the sensing signal RSTB supplied from the voltage sensing circuit 16. The transistor MP6 is disposed between the power supply line VDD and one end of the resistive element R6, and is controlled so that its On/Off state is complementary to that of the transistor MP5. The other end of the resistive element R5 is connected to the signal line SCL, and the other end of the resistive element R6 is connected to the signal line SDA.

For example, when the sensing signal RSTB supplied from the voltage sensing circuit 16 is at an L-level, the transistor MP5 is turned on and the transistor MP6 is turned off. As a result, the signal line SCL is pulled up from the L-level to an H-level and the signal line SDA is maintained at the L-level. In other words, this state is expressed as "(SDA, SCL)=(0, 1)".

On the other hand, when the sensing signal RSTB supplied from the voltage sensing circuit 16 is at an H-level, the transistor MP5 is turned off and the transistor MP6 is turned on. As a result, the signal line SCL is maintained at the L-level and the signal line SDA is pulled up from the L-level to an H-level. In other words, this state is expressed as "(SDA, SCL)=(1, 0)".

In short, in the case where the drive voltage of the module M1 is 3.3 V, when 3.3V-voltage VDD1 is supplied from the control device 1 through the power supply line VDD, the standard information transmitting unit 15 sets the signals SDA and SCL as "(SDA, SCL)=(1, 0)". Further, in the case where the drive voltage of the module M1 is 5 V, when 3.3V-voltage VDD1 is supplied from the control device 1 through the power supply line VDD, the standard information transmitting unit 15 sets the signals SDA and SCL as "(SDA, SCL)=(0, 1)". Further, when 5V-voltage VDD2 is supplied from the control device 1 through the power supply line VDD, the standard information transmitting unit 15 sets the signals SDA and SCL as "(SDA, SCL)=(1, 0)"

(Operation of Semiconductor System SYS1)

Figure 6:
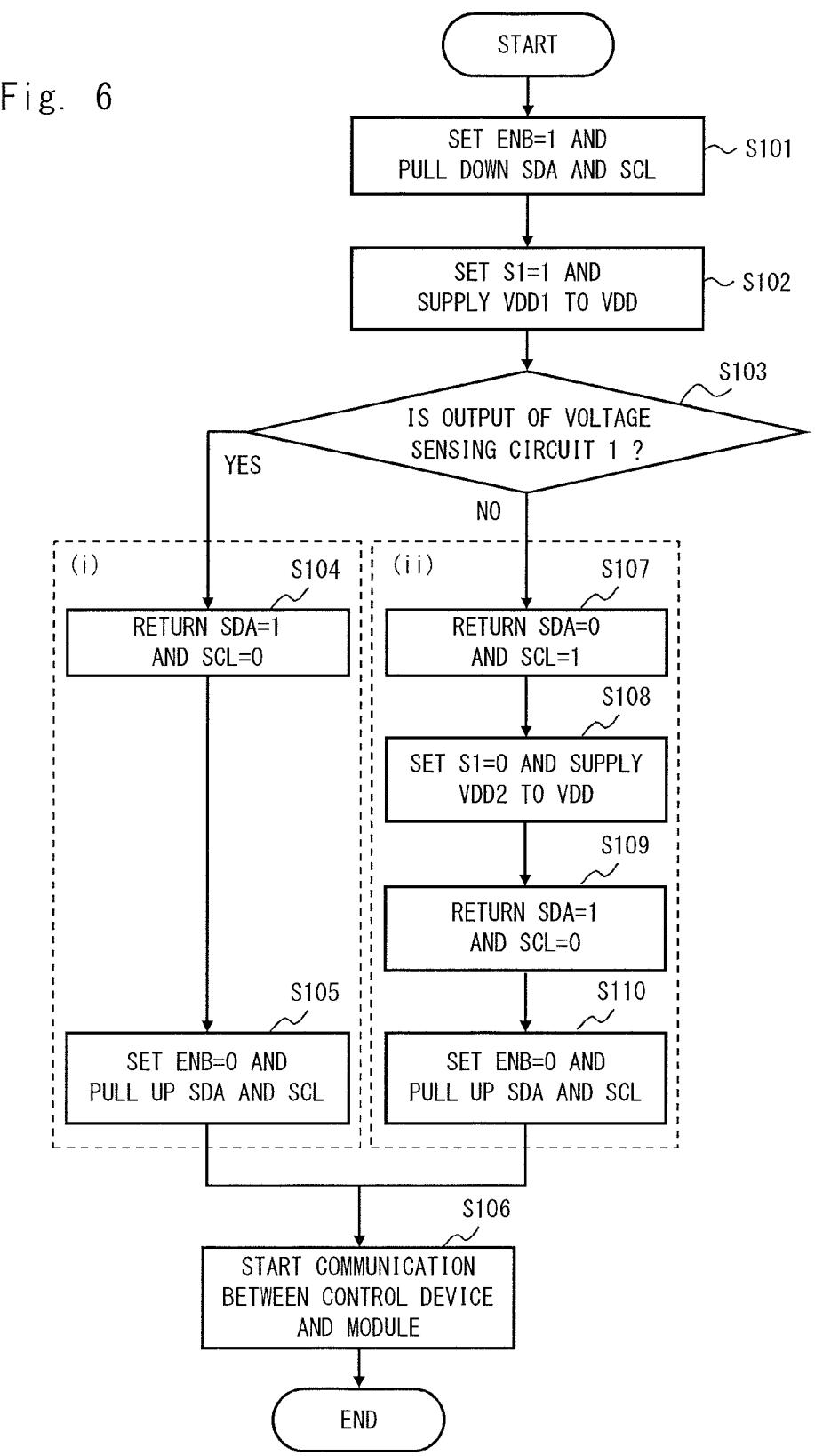
FIG. 6 is a flowchart showing a communication standard setting operation performed by the semiconductor system shown in FIG. 1.

Next, a communication standard setting operation performed by the semiconductor system SYS1 is explained. FIG. 6 is a flowchart showing a communication standard setting operation performed by the semiconductor system SYS1.

As shown in FIG. 6, the control circuit 11 first changes the operation mode to a communication standard acquisition mode by changing the level of the enabling signal ENB to an H-level (ENB=1). As a result, both of the transistors MP3 and MP4 disposed in the signal voltage setting circuit 13 are turned off and hence both of the signal lines SDA and SCL are pulled down to an L-level (step S101). Consequently, the signals SDA and SCL having the L-level are supplied to the module M1.

Further, the control circuit 11 changes the level of the voltage control signal S1 to an H-level (S1=1). As a result, since the transistor MP1 disposed in the supply voltage switching circuit 12 is turned off and the transistor MP2 is turned on, the 3.3V-power supply voltage VDD1 is supplied to the power supply line VDD (step S102).

(i) When the Drive Voltage of the Module M1 is 3.3 V

In the case where the drive voltage of the module M1 is 3.3 V, when 3.3V-voltage VDD1 is supplied to the power supply line VDD, the voltage sensing circuit 16 disposed in the module M1 changes the level of the sensing signal RSTB from an L-level to an H-level. That is, this change is expressed as "RSTB=1" (Yes at step S103).

As a result, since the transistor MP5 disposed in the standard information output circuit 17 is turned off and the transistor MP6 is turned on, the signal line SCL is maintained at the L-level and the signal line SDA is pulled up from the L-level to an H-level. Consequently, the H-level signal SDA and the L-level signal SCL are supplied to the control circuit 11. In other words, this state is expressed as "(SDA, SCL)=(1, 0)" (step S104). Therefore, the control circuit 11 determines that the drive voltage of the module M1 is 3.3 V.

After that, the control circuit 11 changes the operation mode to a normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S105).

After that, the control device 1 and the module M1 start the normal operation (step S106). That is, data communication is started between the control device 1 and the module M1.

(ii) When the Drive Voltage of the Module M1 is 5 V

In the case where the drive voltage of the module M1 is 5 V, when 3.3V-voltage VDD1 is supplied to the power supply line VDD, the voltage sensing circuit 16 disposed in the module M1 maintains the sensing signal RSTB at the L-level. That is, this state is expressed as "RSTB=0" (No at step S103).

As a result, since the transistor MP5 disposed in the standard information output circuit 17 is turned on and the transistor MP6 is turned off, the signal line SCL is pulled up from the L-level to an H-level and the signal line SDA is maintained at the L-level. Consequently, the L-level signal SDA and the H-level signal SCL are supplied to the control circuit 11. In other words, this state is expressed as "(SDA, SCL)=(0, 1)" (step S107). Therefore, the control circuit 11 determines that the drive voltage of the module M1 is higher than 3.3 V.

After that, the control circuit 11 changes the level of the voltage control signal S1 to an L-level (S1=0). As a result, the transistor MP1 disposed in the supply voltage switching circuit 12 is turned on and the transistor MP2 is turned off. Therefore, the 5V-power supply voltage VDD2 is supplied to the power supply line VDD (step S108).

When 5V-voltage VDD2 is supplied to the power supply line VDD, the voltage sensing circuit 16 disposed in the module M1 changes the level of the sensing signal RSTB from the L-level to an H-level. That is, this change is expressed as "RSTB=1". As a result, since the transistor MP5 disposed in the standard information output circuit 17 is turned off and the transistor MP6 is turned on, the signal line SCL is maintained at the L-level and the signal line SDA is pulled up from the L-level to an H-level. Consequently, the H-level signal SDA and the L-level signal SCL are supplied to the control circuit 11. In other words, this state is expressed as "(SDA, SCL)=(1, 0)" (step S109). Therefore, the control circuit 11 determines that the drive voltage of the module M1 is 5 V.

After that, the control circuit 11 changes the operation mode to the normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S110).

After that, the control device 1 and the module M1 start the normal operation (step S106). That is, data communication is started between the control device 1 and the module M1.

This embodiment is explained by using an example case where the module M1 transmits drive voltage information, which is one item of the communication standard information, to the control device 1, and the control device 1 sets the drive voltage supplied to the module M1 based on the received information. However, the present invention is not limited to such an example. For example, the module M1 may transmit other items of communication standard information such as a communication speed to the control device 1, and the control device 1 may set the communication standard between the control device 1 and the module M1 based on the received information.

As described above, in the semiconductor system SYS1, when the control device 1 acquires the communication standard information of the module M1, the module M1 transmits a result of a comparison between a voltage supplied from the control device 1 through the communication bus B1 and a threshold voltage specified based on the communication standard of the module M1 to the control device 1 as the communication standard information of the module M1. As a result, the control device 1 can correctly set the communication standard between the control device 1 and the module M1 based on the communication standard information acquired from the module M1. Consequently, correct data communication can be performed between the control device 1 and the module M1.

Second Embodiment

Figure 7:
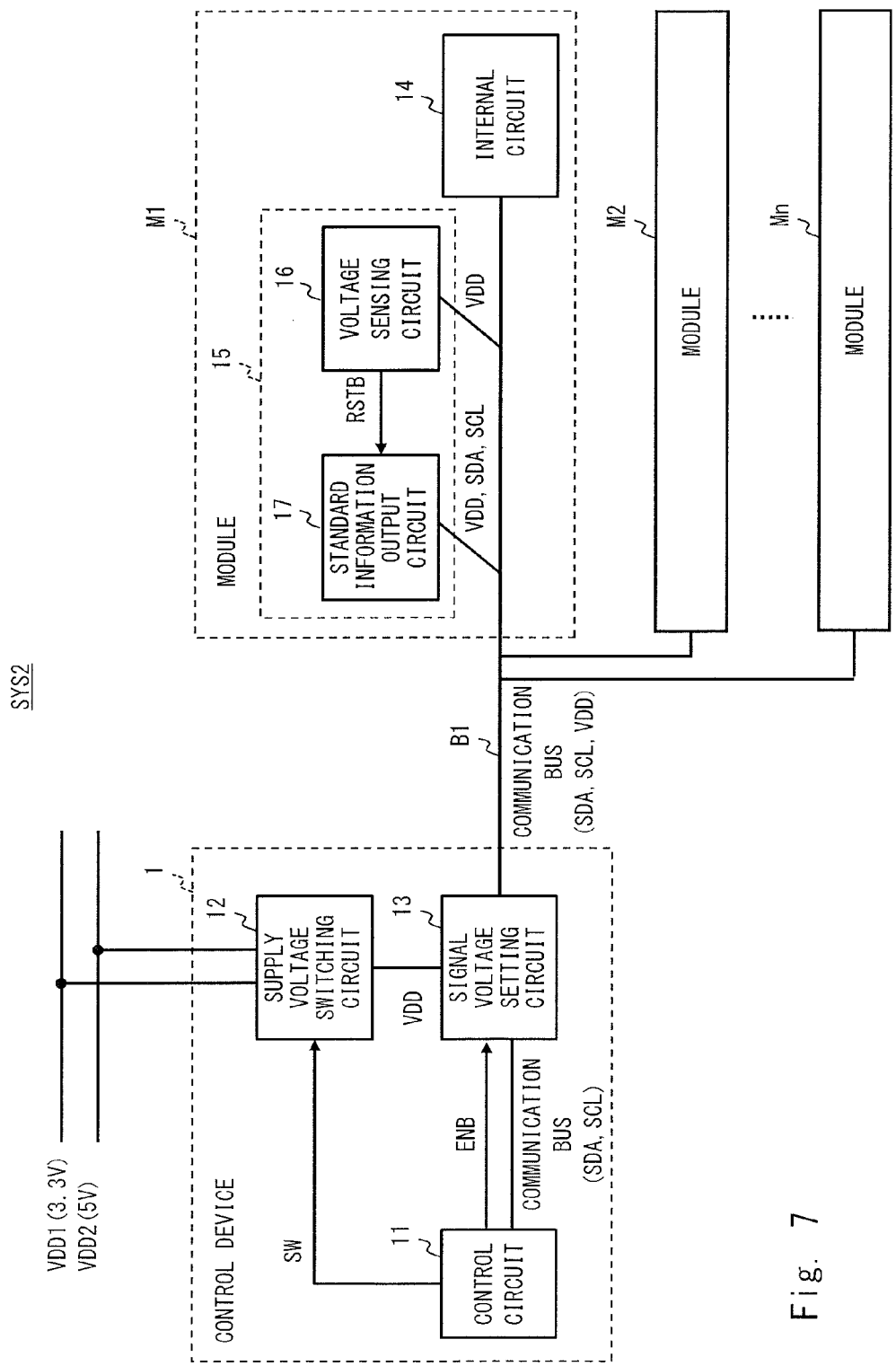
FIG. 7 shows a configuration example of a semiconductor system according to a second embodiment.

FIG. 7 is a block diagram showing a configuration of a semiconductor system SYS2 according to a second embodiment. While the single module M1 is provided in the semiconductor system SYS1, a plurality of modules M1 to Mn (n is an integer no less than two) are provided in the semiconductor system SYS2.

Each of the modules M1 to Mn is connected to the same communication bus B1. The other configuration of the semiconductor system SYS2 is similar to that of the semiconductor system SYS1, and therefore its explanation is omitted.

(Operation of Semiconductor System SYS2)

Next, a communication standard setting operation performed by the semiconductor system SYS2 is explained.

Figure 8:
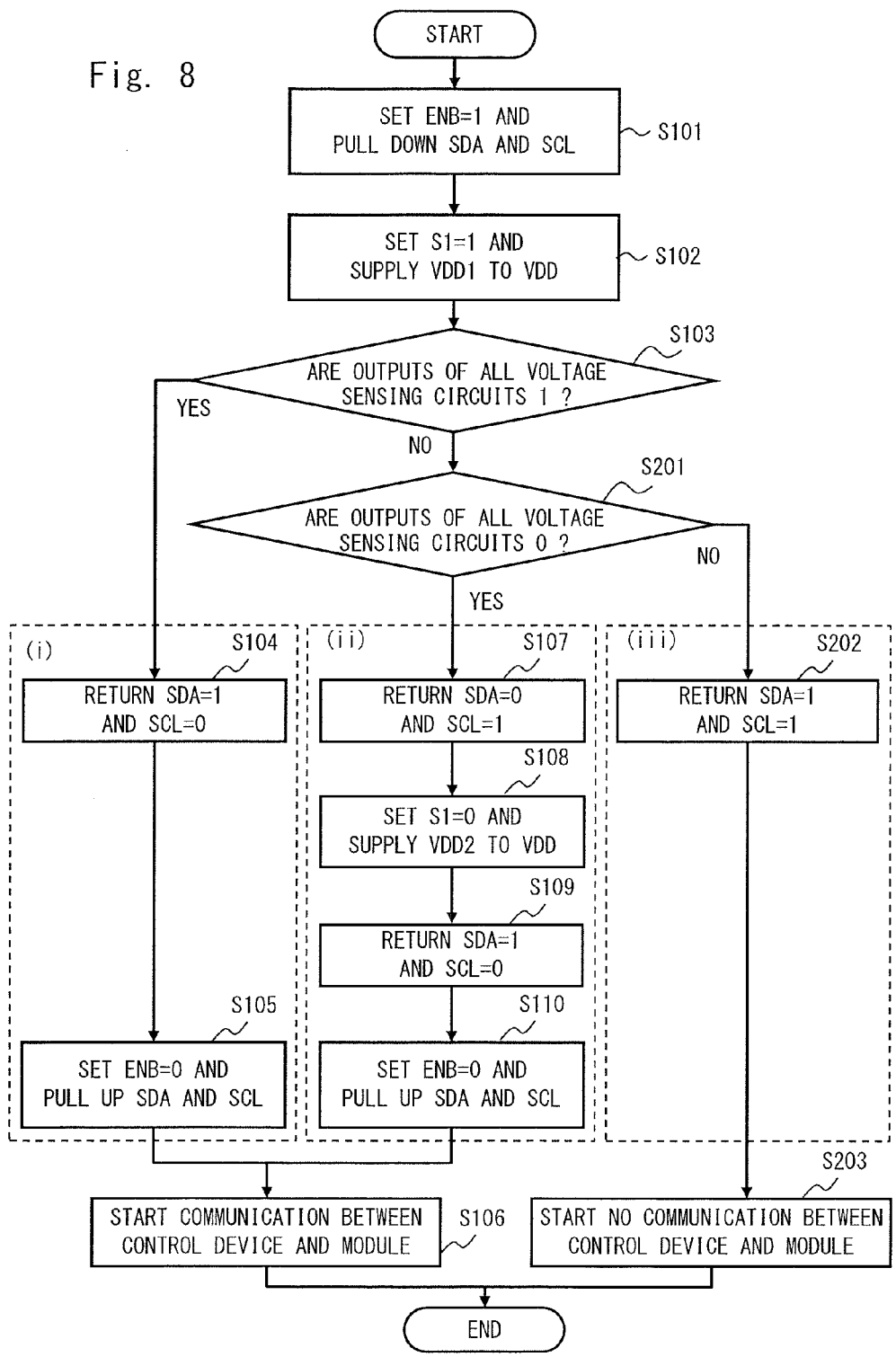
FIG. 8 is a flowchart showing a communication standard setting operation performed by the semiconductor system shown in FIG. 7.

FIG. 8 is a flowchart showing a communication standard setting operation performed by the semiconductor system SYS2.

As shown in FIG. 8, the control circuit 11 first changes the operation mode to a communication standard acquisition mode by changing the level of the enabling signal ENB to an H-level (ENB=1). As a result, both of the transistors MP3 and MP4 disposed in the signal voltage setting circuit 13 are turned off and hence both of the signal lines SDA and SCL are pulled down to an L-level (step S101). Consequently, the signals SDA and SCL having the L-level are supplied to the module M1.

Further, the control circuit 11 changes the level of the voltage control signal S1 to an H-level (S1=1). As a result, the transistor MP1 disposed in the supply voltage switching circuit 12 is turned off and the transistor MP2 is turned on. Therefore, the 3.3V-power supply voltage VDD1 is supplied to the power supply line VDD (step S102).

(i) When the Drive Voltages of all the Modules M1 to Mn are 3.3 V

In the case where the drive voltages of all the modules M1 to Mn are 3.3 V, when 3.3V-voltage VDD1 is supplied to the power supply line VDD, the voltage sensing circuit 16 disposed in each of the modules M1 to Mn changes the level of the sensing signal RSTB from an L-level to an H-level (RSTB=1) (Yes at step S103).

As a result, since the transistor MP5 disposed in the standard information output circuit 17 of each of the modules M1 to Mn is turned off and the transistor MP6 is turned on, the signal line SCL is maintained at the L-level and the signal line SDA is pulled up from the L-level to an H-level. Consequently, the H-level signal SDA and the L-level signal SCL are supplied to the control circuit 11. In other words, this state is expressed as "(SDA, SCL)=(1, 0)" (step S104). Therefore, the control circuit 11 determines that the drive voltages of all the modules M1 to Mn are 3.3 V.

After that, the control circuit 11 changes the operation mode to the normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S105).

After that, the control device 1 and the modules M1 to Mn start the normal operation (step S106). That is, data communication is started between the control device 1 and the modules M1 to Mn. Note that each of the modules M1 to Mn has a unique address. Therefore, as the control device 1 designates the address of one of the modules M1 to Mn, data communication is performed between the control device 1 and the designated module.

(ii) When the Drive Voltages of all the Modules M1 to Mn are 5 V

In the case where the drive voltages of all the modules M1 to Mn are 5 V, when 3.3V-voltage VDD1 is supplied to the power supply line VDD, the voltage sensing circuit 16 disposed in each of the modules M1 to Mn maintains the sensing signal RSTB at the L-level (RSTB=0) (No at step S103->Yes at step S201).

As a result, since the transistor MP5 disposed in the standard information output circuit 17 of each of the modules M1 to Mn is turned on and the transistor MP6 is turned off, the signal line SCL is pulled up from the L-level to an H-level and the signal line SDA is maintained at the L-level. Consequently, the L-level signal SDA and the H-level signal SCL are supplied to the control circuit 11. In other words, this state is expressed as "(SDA, SCL)=(0, 1)" (step S107). Therefore, the control circuit 11 determines that the drive voltages of all the modules M1 to Mn are higher than 3.3 V.

After that, the control circuit 11 changes the level of the voltage control signal S1 to an L-level (S1=0). As a result, since the transistor MP1 disposed in the supply voltage switching circuit 12 is turned on and the transistor MP2 is turned off, the 5V-power supply voltage VDD2 is supplied to the power supply line VDD (step S108).

When 5V-voltage VDD2 is supplied to the power supply line VDD, the voltage sensing circuit 16 disposed in each of the modules M1 to Mn changes the level of the sensing signal RSTB from the L-level to an H-level. That is, this change is expressed as "RSTB=1". As a result, since the transistor MP5 disposed in the standard information output circuit 17 of each of the modules M1 to Mn is turned off and the transistor MP6 is turned on, the signal line SDA is pulled up from the L-level to an H-level and the signal line SCL is maintained at the L-level. Consequently, the H-level signal SDA and the L-level signal SCL are supplied to the control circuit 11. In other words, this state is expressed as "(SDA, SCL)=(1, 0)" (step S109). Therefore, the control circuit 11 determines that the drive voltages of all the modules M1 to Mn are 5 V.

After that, the control circuit 11 changes the operation mode to the normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S110).

After that, the control device 1 and the modules M1 to Mn start the normal operation (step S106). That is, data communication is started between the control device 1 and the modules M1 to Mn. Note that each of the modules M1 to Mn has a unique address. Therefore, as the control device 1 designates the address of one of the modules M1 to Mn, data communication is performed between the control device 1 and the designated module.

(iii) When the Drive Voltages of Some the Modules M1 to Mn are 3.3 V and those of the others are 5 V In the case where the drive voltages of some of the modules M1 to Mn are 3.3 V and those of the others are 5 V, the sensing signal RSTB is raised to an H-level in the modules having the drive voltage of 3.3 V and the sensing signal RSTB is maintained at an L-level in the modules having the drive voltage of 5 V (No at step S103->No at step S201).

As a result, in the modules having the drive voltage of 3.3 V, the signal line SDA is pulled up to an H-level as in the case of the process in the step S104. Further, in the modules having the drive voltage of 5 V, the signal line SCL is pulled up to an H-level as in the case of the process in the step S107. Consequently, the signals SDA and SCL having the H-level are supplied to the control circuit 11. In other words, this state is expressed as "(SDA, SCL)=(1, 1)" (step S202). Therefore, the control circuit 11 determines that the drive voltages of the modules M1 to Mn are not the same as each other.

In this case, no data communication is performed between the control device 1 and the modules M1 to Mn (step S203).

This embodiment is explained by using an example case where each of the modules M1 to Mn transmits drive voltage information, which is one of the communication standard information, to the control device 1, and the control device 1 sets the drive voltage supplied to each of the modules M1 to Mn based on the received information. However, the present invention is not limited to such an example. For example, each of the modules M1 to Mn may transmit other communication standard information such as a communication speed to the control device 1, and the control device 1 may set the communication standard between the control device 1 and each of the modules M1 to Mn based on the received information.

As described above, in the semiconductor system SYS2, when the control device 1 acquires the communication standard information of the modules M1 to Mn, each of the modules M1 to Mn transmits a result of a comparison between a voltage supplied from the control device 1 through the communication bus B1 and a threshold voltage to the control device 1 as its communication standard information. As a result, the control device 1 can correctly set the communication standard between the control device 1 and the modules M1 to Mn based on the communication standard information acquired from the modules M1 to Mn. Consequently, correct data communication can be performed between the control device 1 and the modules M1 to Mn.

Further, in the semiconductor system SYS2, when the communication standard of at least one of the modules M1 to Mn differs from that of the other modules, no data communication is performed between the control device 1 and the modules M1 to Mn. This can prevent an erroneous data communication operation, and prevent a drive voltage higher than the rated voltage from being applied to the module and thereby prevent the module from being broken.

Further, in the semiconductor system SYS2, the communication standard information of each of the modules M1 to Mn is transmitted to the control device 1 through the existing communication bus B1 without using any additional signal line. Therefore, an increase in the number of wiring lines can be prevented.

(Differences from Related Art)

Note that in the configuration disclosed in Japanese Unexamined Patent Application Publication No. 2010-154615, when the system is configured so that a power supply voltage is supplied from the power supply voltage supply unit to each of a plurality of devices, it is necessary to provide a plurality of control signal lines for individually connecting the power supply voltage supply unit to each of the plurality of devices, thus increasing the number of wiring lines. Alternatively, if the plurality of devices are connected to one common control signal line, the combined resistances of the plurality of devices are combined with each other, thus making it impossible for the power supply voltage supply unit to correctly read the combined resistance of the modules M1 to Mn (power supply voltage information). In contrast to this, as described above, the semiconductor system SYS2 can correctly set the communication standard between the control device 1 and each of the modules M1 to Mn without increasing the number of wiring lines.

Third Embodiment

Figure 9:
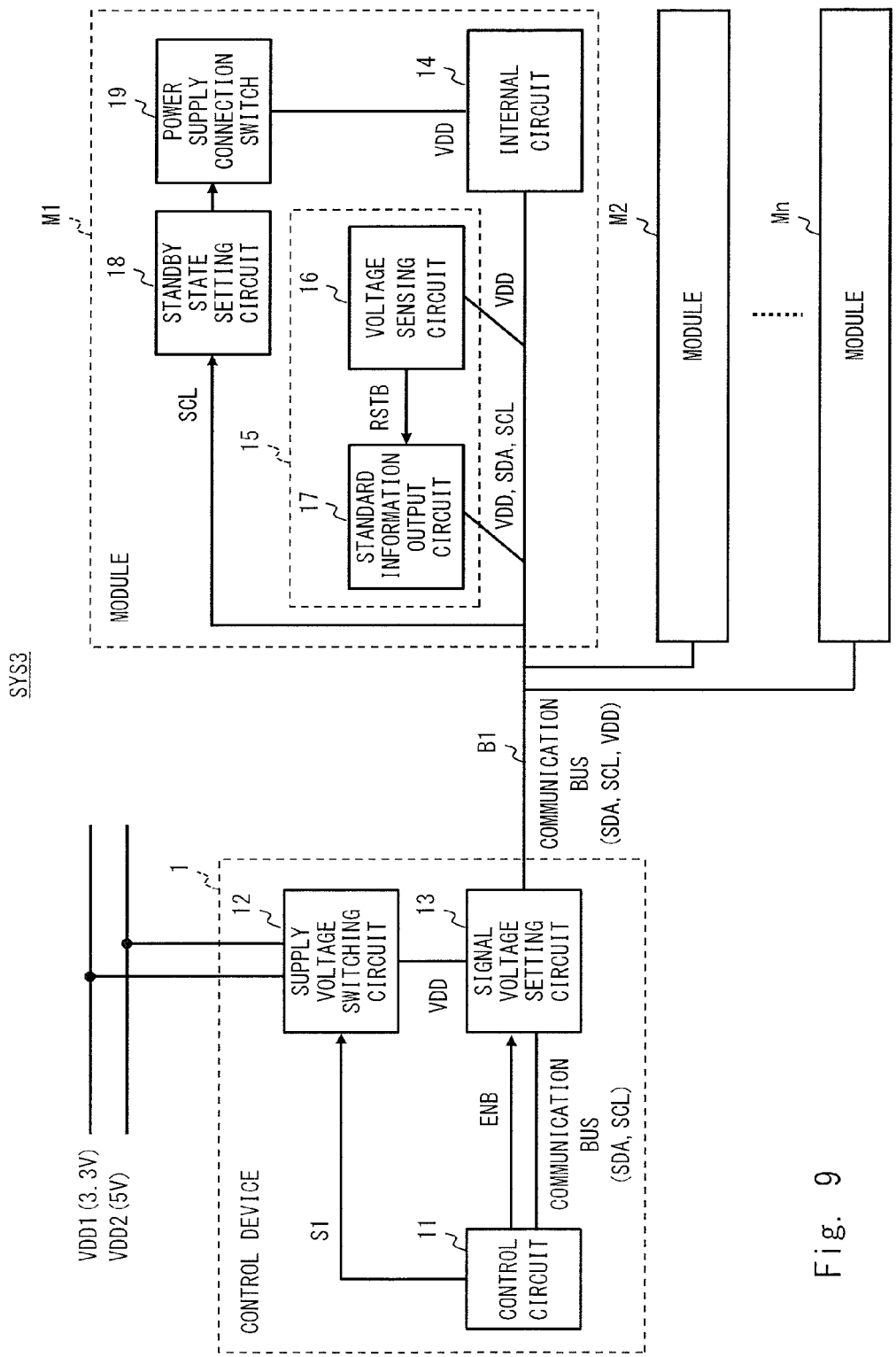
FIG. 9 shows a configuration example of a semiconductor system according to a third embodiment.

FIG. 9 is a block diagram showing a configuration of a semiconductor system SYS3 according to a third embodiment. In the semiconductor system SYS2, when both a module having a 3.3V-direive voltage and a module having a 5V-direive voltage are connected to the communication bus B1, the control device 1 do not perform data communication with any of the modules. In contrast to this, in the semiconductor system SYS3, the control device 1 stops the voltage supply to the modules having one of the drive voltages (first communication standard) so that the control device 1 can perform data communication with the modules having the other drive voltage (second communication standard). The third embodiment is explained hereinafter in a detailed manner.

When compared with the modules M1 to Mn in the semiconductor system SYS2, each of a plurality of modules M1 to Mn in the semiconductor system SYS3 further includes a standby state setting circuit 18 and a power supply connection switch (power supply switch) 19.

The standby state setting circuit 18 and the power supply connection switch 19 provided in the module M1 are explained hereinafter as representative examples of those of the modules M1 to Mn. Note that power supply connection switch 19 and the standby state setting circuit 18 disposed in each of the modules M2 to Mn are similar to these explained below.

The standby state setting circuit 18 is a circuit that performs control as to whether a drive voltage should be supplied to the module M1 or not according to a request from the control circuit 11. The power supply connection switch 19 is a circuit that changes the connection/disconnection between the power supply line VDD and its own power supply voltage terminal based on a control signal supplied from the standby state setting circuit 18.

Figure 10:
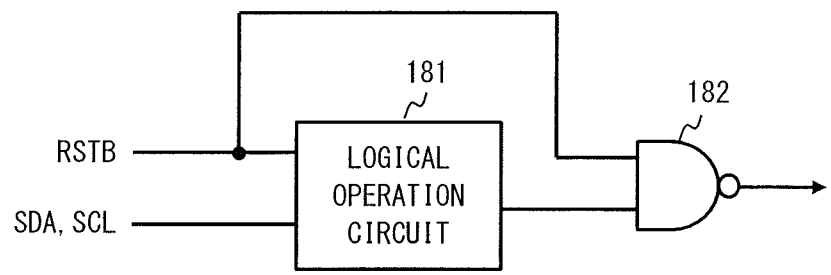
FIG. 10 is a block diagram showing a configuration example of a standby state setting circuit provided in the semiconductor system shown in FIG. 9.

FIG. 10 is a block diagram showing a configuration example of the standby state setting circuit 18.

As shown in FIG. 10, the standby state setting circuit 18 includes a logical operation circuit 181 and an inverted logical multiplication circuit (hereinafter simply referred to as a "NAND circuit") 182.

The logical operation circuit 181 outputs a result of a logical operation between the sensing signal RSTB and the value of the signal SDA and SCL. The NAND circuit 182 outputs the inverted logical multiplication of the output of the logical operation circuit 181 and the sensing signal RSTB as the control signal of the standby state setting circuit 18.

For example, the standby state setting circuit 18 performs the following processes (a), (b) and (c). (a) When the sensing signal RSTB is at an L-level, the standby state setting circuit 18 outputs a control signal having an H-level. (b) In the case where the sensing signal RSTB is at an H-level and both the signal SDA and SCL are at an H-level in an initial state upon power-up, when the signal SCL changes to an L-level, the output of the logical operation circuit 18 is fixed to an H-level until the system is powered up again, and hence the standby state setting circuit 18 fixes the control signal to an L-level. (c) In the case where the sensing signal RSTB is at an H-level and both the signal SDA and SCL are at an H-level in an initial state upon power-up, when the signal SDA changes to an L-level, the output of the logical operation circuit 18 is fixed to an L-level until the system is powered up again, and hence the standby state setting circuit 18 fixes the control signal to an H-level.

Figure 11:
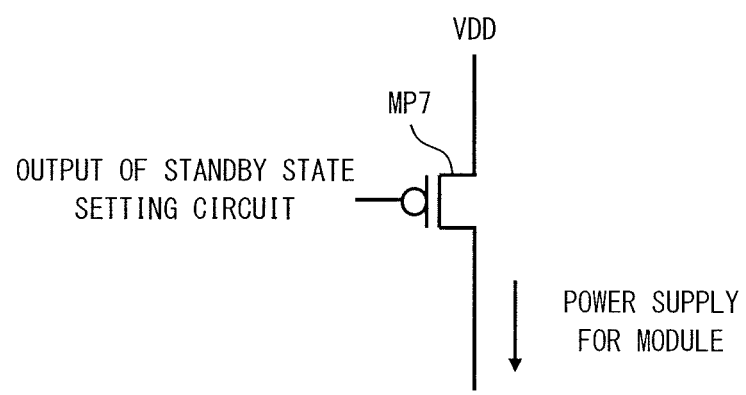
FIG. 11 is a circuit diagram showing a configuration example of a power supply connection switch provided in the semiconductor system shown in FIG. 9.

FIG. 11 is a circuit diagram showing a configuration example of the power supply connection switch 19.

As shown in FIG. 11, the power supply connection switch 19 includes a P-channel MOS transistor (hereinafter simply referred to as a "transistor") MP7.

The transistor MP7 is disposed between the power supply line VDD and the power supply voltage terminal of the module M1, and its On/Off state is controlled according to the control signal supplied from the standby state setting circuit 18. For example, when the control signal from the standby state setting circuit 18 is at an L-level, the transistor MP7 is turned on. Therefore, the power supply voltage terminal of the module M1 is electrically connected to the power supply line VDD. On the other hand, when the control signal from the standby state setting circuit 18 is at an H-level, the transistor MP7 is turned off. Therefore, the power supply voltage terminal of the module M1 is not electrically connected to the power supply line VDD.

Note that this embodiment is explained by using an example case where only the power supply line VDD is equipped with the power supply connection switch 19. However, the present invention is not limited to such an example. The signal lines SDA and SCL may also be equipped with a power supply connection switch(es) 19.

(Operation of Semiconductor System SYS3)

Next, a communication standard setting operation performed by the semiconductor system SYS3 is explained.

Figure 12:
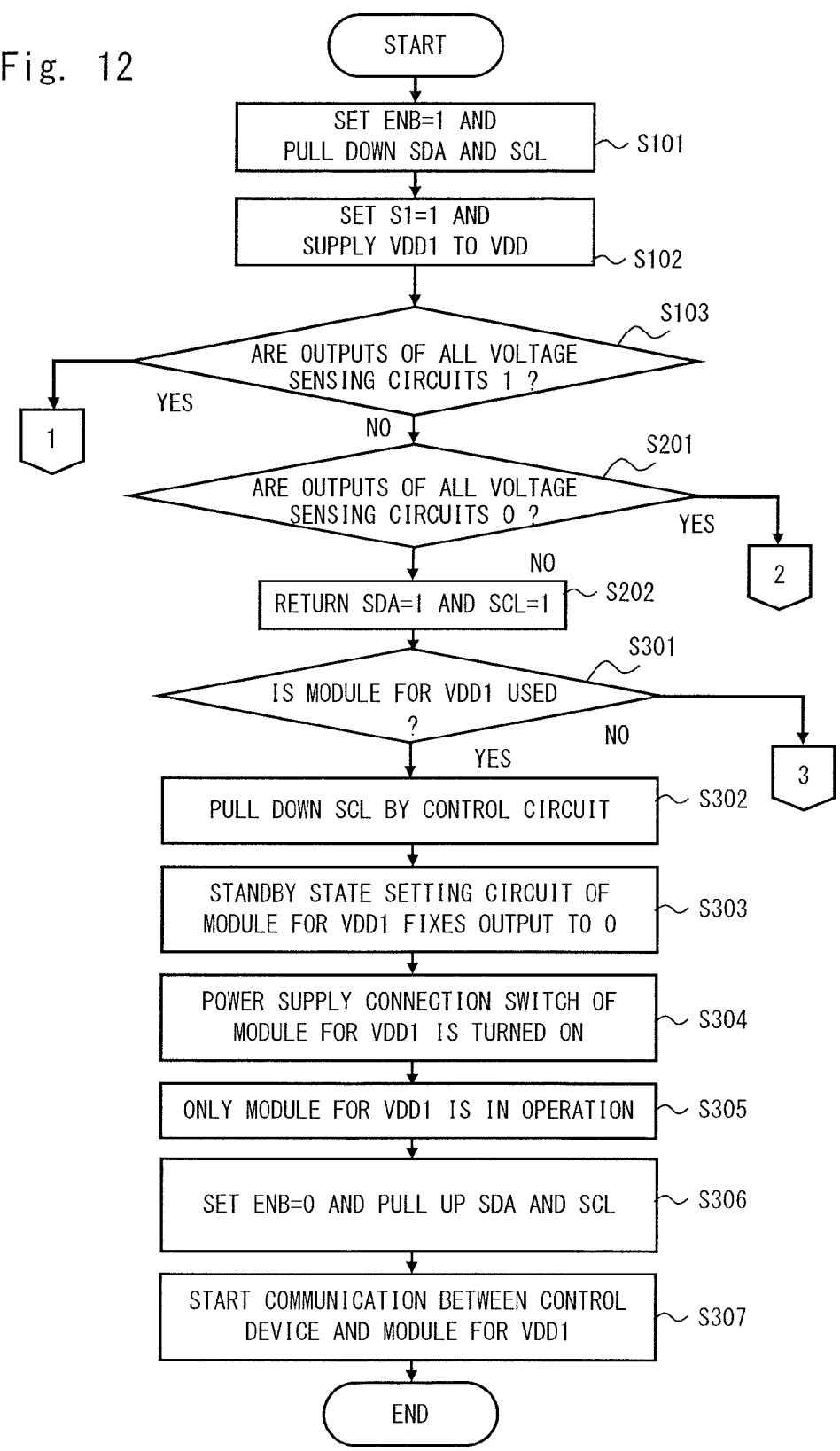
FIG. 12 is a flowchart showing a communication standard setting operation performed by the semiconductor system shown in FIG. 9.
Figure 13:
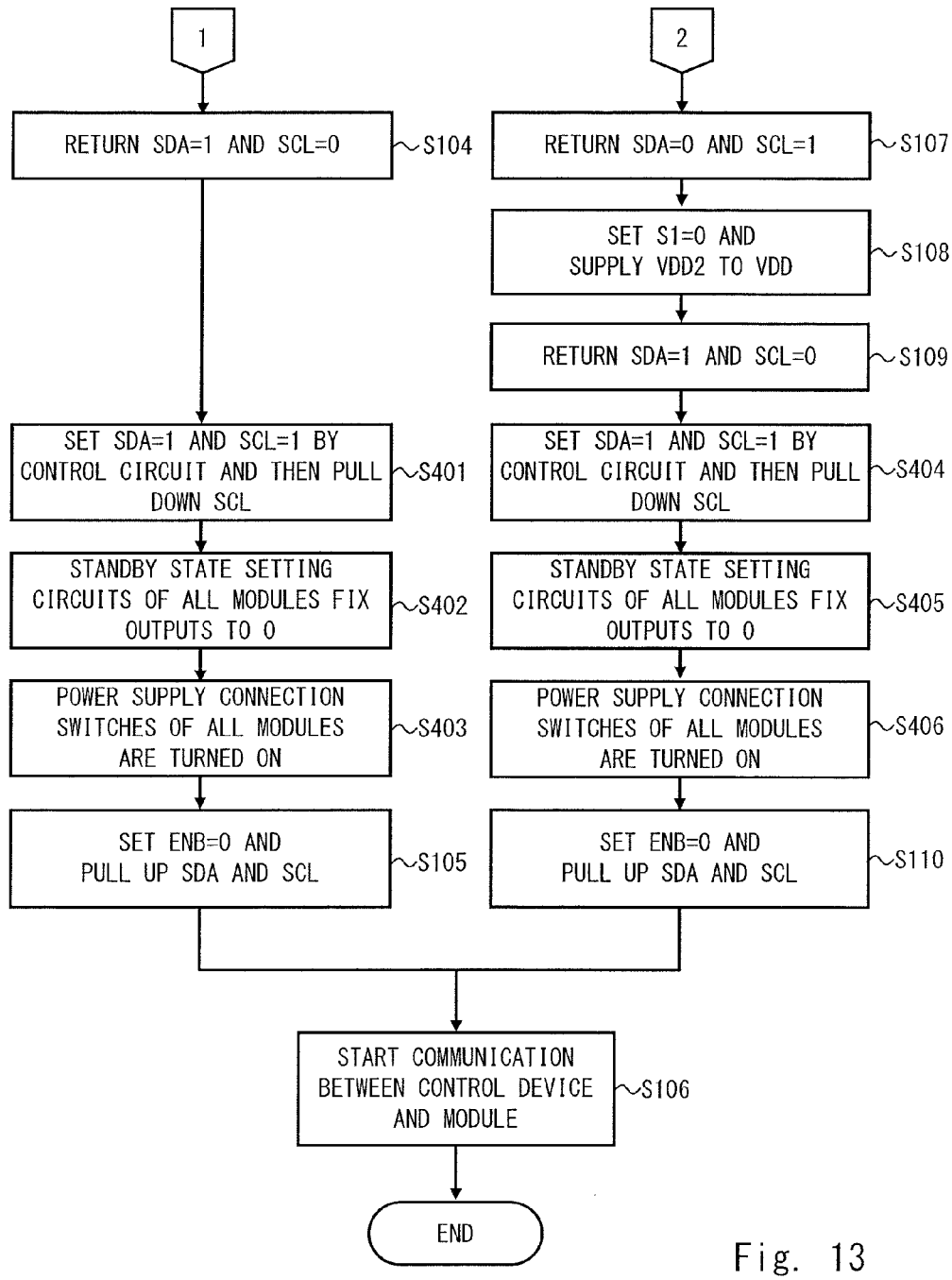
FIG. 13 is a flowchart showing a communication standard setting operation performed by the semiconductor system shown in FIG. 9.
Figure 14:
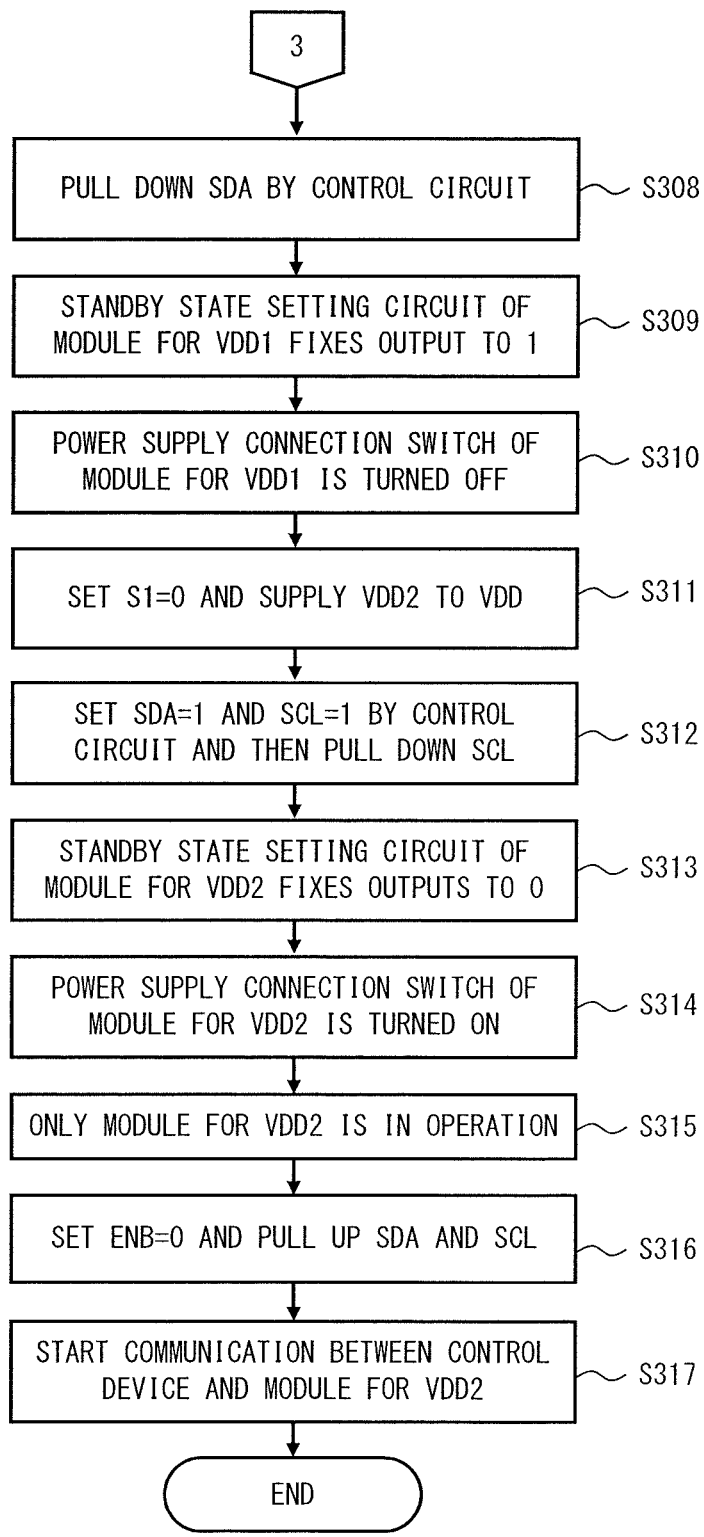
FIG. 14 is a flowchart showing a communication standard setting operation performed by the semiconductor system shown in FIG. 9.

FIGS. 12, 13 and 14 are flowcharts showing a communication standard setting operation performed by the semiconductor system SYS3.

The control circuit 11 first changes the operation mode to a communication standard acquisition mode by changing the level of the enabling signal ENB to an H-level (ENB=1). As a result, both of the transistors MP3 and MP4 disposed in the signal voltage setting circuit 13 are turned off and hence both of the signal lines SDA and SCL are pulled down to an L-level (step S101 in FIG. 12). Consequently, the signals SDA and SCL having the L-level are supplied to the module M1.

Further, the control circuit 11 changes the level of the voltage control signal S1 to an H-level (S1=1). As a result, the transistor MP1 disposed in the supply voltage switching circuit 12 is turned off and the transistor MP2 is turned on. Therefore, the 3.3V-power supply voltage VDD1 is supplied to the power supply line VDD (step S102 in FIG. 12).

(i) When the Drive Voltages of all the Modules M1 to Mn are 3.3 V

In the case where the drive voltages of all the modules M1 to Mn are 3.3 V, when 3.3V-voltage VDD1 is supplied to the power supply line VDD, the voltage sensing circuit 16 disposed in each of the modules M1 to Mn changes the level of the sensing signal RSTB from an L-level to an H-level (RSTB=1) (Yes at step S103 in FIG. 12).

As a result, since the transistor MP5 disposed in the standard information output circuit 17 of each of the modules M1 to Mn is turned off and the transistor MP6 is turned on, the signal line SCL is maintained at the L-level and the signal line SDA is pulled up from the L-level to an H-level. Consequently, the H-level signal SDA and the L-level signal SCL are supplied to the control circuit 11. In other words, this state is expressed as "(SDA, SCL)=(1, 0)" (step S104 in FIG. 13). Therefore, the control circuit 11 determines that the drive voltages of all the modules M1 to Mn are 3.3 V.

After that, the control circuit 11 sets the signal SDA and SCL to an H-level and then pulls down the signal SCL from the H-level to an L-level (step S401 in FIG. 13). As a result, the standby state setting circuit 18 of each of the modules M1 to Mn performs the above-described process (b) and hence fixes the control signal to an L-level (step S402 in FIG. 13). Consequently, since the power supply connection switch 19 of each of the modules M1 to Mn is turned on (step S403 in FIG. 13), the 3.3V-power supply voltage VDD1 is supplied to the internal circuit 14 of each of the modules M1 to Mn through the power supply line VDD.

After that, the control circuit 11 changes the operation mode to the normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S105 in FIG. 13).

After that, the control device 1 and the modules M1 to Mn start the normal operation (step S106 in FIG. 13). That is, data communication is started between the control device 1 and the modules M1 to Mn.

(ii) When the Drive Voltages of all the Modules M1 to Mn are 5 V

In the case where the drive voltages of all the modules M1 to Mn are 5 V, when 3.3V-voltage VDD1 is supplied to the power supply line VDD, the voltage sensing circuit 16 disposed in each of the modules M1 to Mn maintains the sensing signal RSTB at the L-level (RSTB=0) (No at step S103->Yes at step S201 in FIG. 12).

As a result, since the transistor MP5 disposed in the standard information output circuit 17 of each of the modules M1 to Mn is turned on and the transistor MP6 is turned off, the signal line SCL is pulled up from the L-level to an H-level and the signal line SDA is maintained at the L-level. Consequently, the L-level signal SDA and the H-level signal SCL are supplied to the control circuit 11. In other words, this state is expressed as "(SDA, SCL)=(0, 1)" (step S107 in FIG. 13). Therefore, the control circuit 11 determines that the drive voltages of all the modules M1 to Mn are higher than 3.3 V.

After that, the control circuit 11 changes the level of the voltage control signal S1 to an L-level (S1=0). As a result, the transistor MP1 disposed in the supply voltage switching circuit 12 is turned on and the transistor MP2 is turned off. Therefore, the 5V-power supply voltage VDD2 is supplied to the power supply line VDD (step S108 in FIG. 13).

When 5V-voltage VDD2 is supplied to the power supply line VDD, the voltage sensing circuit 16 disposed in each of the modules M1 to Mn changes the level of the sensing signal RSTB from the L-level to an H-level. That is, this change is expressed as "RSTB=1". As a result, since the transistor MP5 disposed in the standard information output circuit 17 of each of the modules M1 to Mn is turned off and the transistor MP6 is turned on, the signal line SDA is pulled up from the L-level to an H-level and the signal line SCL is maintained at the L-level. Consequently, the H-level signal SDA and the L-level signal SCL are supplied to the control circuit 11. In other words, this state is expressed as "(SDA, SCL)=(1, 0)" (step S109 in FIG. 13). Therefore, the control circuit 11 determines that the drive voltages of all the modules M1 to Mn are 5 V.

After that, the control circuit 11 sets the signal SDA and SCL to an H-level and then pulls down the signal SCL from the H-level to an L-level (step S404 in FIG. 13). As a result, the standby state setting circuit 18 of each of the modules M1 to Mn performs the above-described process (b) and hence fixes the control signal to an L-level (step S405 in FIG. 13). Consequently, since the power supply connection switch 19 of each of the modules M1 to Mn is turned on (step S406 in FIG. 13), the 5V-power supply voltage VDD2 is supplied to the internal circuit 14 of each of the modules M1 to Mn through the power supply line VDD.

After that, the control circuit 11 changes the operation mode to the normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S110 in FIG. 13).

After that, the control circuit 11 and the modules M1 to Mn start the normal operation (step S106 in FIG. 13). That is, data communication is started between the control circuit 11 and the modules M1 to Mn.

(iii) When the Drive Voltages of some the Modules M1 to Mn are 3.3 V and those of the others are 5 V In the case where the drive voltages of some of the modules M1 to Mn are 3.3 V and those of the others are 5 V, the sensing signal RSTB is raised to an H-level in the modules having the drive voltage of 3.3 V and the sensing signal RSTB is maintained at an L-level in the modules having the drive voltage of 5 V (No at step S103->No at step S201 in FIG. 12).

As a result, in the modules having the drive voltage of 3.3 V, the signal line SDA is pulled up to an H-level as in the case of the process in the step S104. Further, in the modules having the drive voltage of 5 V, the signal line SCL is pulled up to an H-level as in the case of the process in the step S107. Consequently, the signals SDA and SCL having the H-level are supplied to the control circuit 11. In other words, this state is expressed as "(SDA, SCL)=(1, 1)" (step S202 in FIG. 12). Therefore, the control circuit 11 determines that the drive voltages of the modules M1 to Mn are not the same as each other.

Here, it is determined that modules having which drive voltage should be used among the modules M1 to Mn (step S301 in FIG. 12).

For example, when the modules having the 3.3V-drive voltage are used (Yes at step S301 in FIG. 12), the control circuit 11 pulls down the signal SCL from the H-level to an L-level (step S302 in FIG. 12). As a result, the standby state setting circuit 18 of each of the modules having the 3.3V-drive voltage performs the above-described process (b) and hence fixes the control signal to an L-level (step S303 in FIG. 12). Consequently, since the power supply connection switch 19 of each of the modules having the 3.3V-drive voltage is turned on (step S304 in FIG. 12), the 3.3V-power supply voltage VDD1 is supplied to the each of the modules having the 3.3V-drive voltage through the power supply line VDD.

Note that in this state, the sensing signal RSTB of each of the modules having the 5V-drive voltage is maintained at the L-level. Therefore, the standby state setting circuit 18 of each of the modules having the 5V-drive voltage is outputting a control signal having an H-level to perform the above-described process (a). As a result, since the power supply connection switch 19 disposed in each of the modules having the 5V-drive voltage is turned off, the power supply voltage is not supplied to each of the modules having the 5V-drive voltage.

That is, the system is in a state where only the modules having the 3.3V-drive voltage are operable among the modules M1 to Mn (step S305 in FIG. 12).

After that, the control circuit 11 changes the operation mode to the normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S306 in FIG. 12).

After that, the control device 1 and the modules having the 3.3V-drive voltage start the normal operation (step S307 in FIG. 12). That is, data communication is started between the control device 1 and the modules having the 3.3V-drive voltage.

On the other hand, when the modules having the 5V-drive voltage are used (No at step S301 in FIG. 12), the control circuit 11 pulls down the signal SDA from the H-level to an L-level (step S308 in FIG. 14). As a result, the standby state setting circuit 18 of each of the modules having the 3.3V-drive voltage performs the above-described process (c) and hence fixes the control signal to an H-level (step S309 in FIG. 14). Consequently, since the power supply connection switch 19 of each of the modules having the 3.3V-drive voltage is turned off (step S310 in FIG. 14), the power supply voltage is not supplied to the each of the modules having the 3.3V-drive voltage.

After that, the control circuit 11 changes the level of the voltage control signal S1 to an L-level (S1=0). As a result, the transistor MP1 disposed in the supply voltage switching circuit 12 is turned on and the transistor MP2 is turned off. Therefore, the 5V-power supply voltage VDD2 is supplied to the power supply line VDD (step S311 in FIG. 14). Further, as a result, the sensing signal RSTB of each of the modules having the 5V-drive voltage is raised to an H-level.

After that, the control circuit 11 sets the signal SDA and SCL to an H-level and then pulls down the signal SCL from the H-level to an L-level (step S312 in FIG. 14). As a result, the standby state setting circuit 18 of each of the modules having the 5V-drive voltage performs the above-described process (b) and hence fixes the control signal to an L-level (step S313 in FIG. 14). Consequently, since the power supply connection switch 19 of each of the modules having the 5.5V-drive voltage is turned on (step S314 in FIG. 14), the 5V-power supply voltage VDD2 is supplied to each of the modules having the 5V-drive voltage through the power supply line VDD.

That is, the system is in a state where only the modules having the 5V-drive voltage are operable among the modules M1 to Mn (step S315 in FIG. 14).

After that, the control circuit 11 changes the operation mode to the normal operation mode by changing the level of the enabling signal ENB to an L-level (ENB=0). As a result, both of the transistors MP3 and MP4 disposed in the signal voltage setting circuit 13 are turned on and hence both of the signal lines SDA and SCL are pulled up to an H-level (step S316 in FIG. 14).

After that, the control device 1 and the modules having the 5V-drive voltage start the normal operation (step S317 in FIG. 14). That is, data communication is started between the control device 1 and the modules having the 5V-drive voltage.

As described above, in the semiconductor system SYS3, when the control device 1 acquires the communication standard information of the modules M1 to Mn, each of the modules M1 to Mn transmits a result of a comparison between a voltage supplied from the control device 1 through the communication bus B1 and a threshold voltage to the control device 1 as its communication standard information. As a result, the control device 1 can correctly set the communication standard between the control device 1 and the modules M1 to Mn based on the communication standard information acquired from the modules M1 to Mn. Consequently, correct data communication can be performed between the control device 1 and the modules M1 to Mn.

Further, in the semiconductor system SYS3, even when some of the modules M1 to Mn have a communication standard different from that of the other modules, data communication can be performed between the control device 1 and the modules having either one of the communication standards.

Further, in the semiconductor system SYS3, the communication standard information of each of the modules M1 to Mn is transmitted to the control device 1 through the existing communication bus B1 without using any additional signal line. Therefore, an increase in the number of wiring lines can be prevented.

As described above, in the semiconductor systems according to the above-described first to third embodiments, when the control device acquires the communication standard information of the module, the module transmits a result of a comparison between a voltage supplied from the control device through a communication bus and a threshold voltage to the control device as the communication standard information. As a result, the control device can correctly set the communication standard between the control device and the module based on the communication standard information acquired from the module. Consequently, correct data communication can be performed between the control device and the module.

Further, in the semiconductor systems according to the above-described second and third embodiments, no additional signal line is required even when there are a plurality of modules in the semiconductor system, thus making it possible to prevent an increase in the number of wiring lines.

The present invention made by the inventors has been explained above in a specific manner based on embodiments. However, the present invention is not limited to the above-described embodiments, and needless to say, various modifications can be made without departing from the spirit and scope of the present invention.

For example, the semiconductor device according to the above-described embodiment may have a configuration in which the conductivity type (p-type or n-type) of the semiconductor substrate, the semiconductor layer, the diffusion layer (diffusion region), and so on may be reversed. Therefore, when one of the n-type and p-type is defined as a first conductivity type and the other is defined as a second conductivity type, the first and second conductivity types may be the p-type and n-type, respectively. Alternatively, the first and second conductivity types may be the n-type and p-type, respectively.

The first to third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
an internal circuit; and
a standard information transmitting unit that directly transmits a result of a comparison between a voltage supplied from an externally-disposed control device and a threshold voltage specified based on a communication standard of the internal circuit to the control device as information on the communication standard of the internal circuit.

2. The semiconductor device according to claim 1, wherein the standard information transmitting unit comprises:
a voltage sensing circuit that changes a sensing signal to an active state when the voltage supplied from the control device becomes higher than the threshold voltage; and
a standard information output circuit that sets, as the result of the comparison, a voltage level of a signal line provided between the internal circuit and the control device to a value according to a state of the sensing signal.

3. The semiconductor device according to claim 1, wherein the information on the communication standard is information on a drive voltage of the internal circuit.

4. A semiconductor device comprising:
an internal circuit; and
a standard information transmitting unit that transmits a result of a comparison between a voltage supplied from an externally-disposed control device and a threshold voltage specified based on a communication standard of the internal circuit to the control device as information on the communication standard of the internal circuit, wherein:
the information on the communication standard is information on a drive voltage of the internal circuit, and
the semiconductor device further comprises a power supply switch that performs control as to whether or not the voltage supplied from the control device should be supplied to the internal circuit as a drive voltage.

5. A semiconductor system comprising:
at least one semiconductor device according to claim 1;
the control device; and
a signal line connecting the control device with the at least one semiconductor device.

6. A semiconductor system comprising:
semiconductor devices according to claim 4, one of the semiconductor devices having a first communication standard and the other semiconductor device having a second communication standard different from the first communication standard;
the control device; and
a signal line connecting the control device with the semiconductor devices having the first and second communication standards, wherein
the power supply switch disposed in one of the semiconductor devices having the first and second communication standards is controlled to an On-state and the power supply switch disposed in the other of the semiconductor devices having the first and second communication standards is controlled to an Off-state.

7. A control method of a semiconductor device comprising:
receiving a voltage from an externally-disposed control device; and
directly transmitting a result of a comparison between the received voltage and a threshold voltage specified based on a communication standard of an internal circuit to the control device as information on the communication standard of the internal circuit.

8. The control method of a semiconductor device according to claim 7, wherein the comparison result transmission comprises:
changing a sensing signal to an active state when the received voltage becomes higher than the threshold voltage; and
setting, as the result of the comparison, a voltage level of a signal line provided between the internal circuit and the control device to a value according to a state of the sensing signal.

9. The control method of a semiconductor device according to claim 7, wherein the information on the communication standard is information on a drive voltage of the internal circuit.

10. The control method of a semiconductor device according to claim 7, wherein
the information on the communication standard is information on a drive voltage of the internal circuit, and
the control method further comprises performing control as to whether or not the voltage supplied from the control device should be supplied to the internal circuit as a drive voltage.

11. A control method of a semiconductor device according to claim 10, further comprising:
cutting off the supply of the drive voltage to the internal circuit of one of a semiconductor device having a first communication standard and a semiconductor device having a second communication standard different from the first communication standard; and
supplying the drive voltage to the internal circuit of the other of the semiconductor devices having the first and second communication standards.

12. The semiconductor device according to claim 1, wherein the supplied voltage and the result of a comparison are transmitted though the same communication bus.

13. The control method of a semiconductor device according to claim 7, wherein the received voltage and the result of a comparison are transmitted though the same communication bus.

* * * * *